INVENTOR.
HOMER S. HARRISON

Jan. 13, 1959 H. S. HARRISON 2,868,352
TELEVISION TUBE SETTLING CONVEYOR
Filed Sept. 24, 1954 3 Sheets-Sheet 2

INVENTOR.
HOMER S. HARRISON
BY
*Farley Forster & Farley*

ATTORNEYS

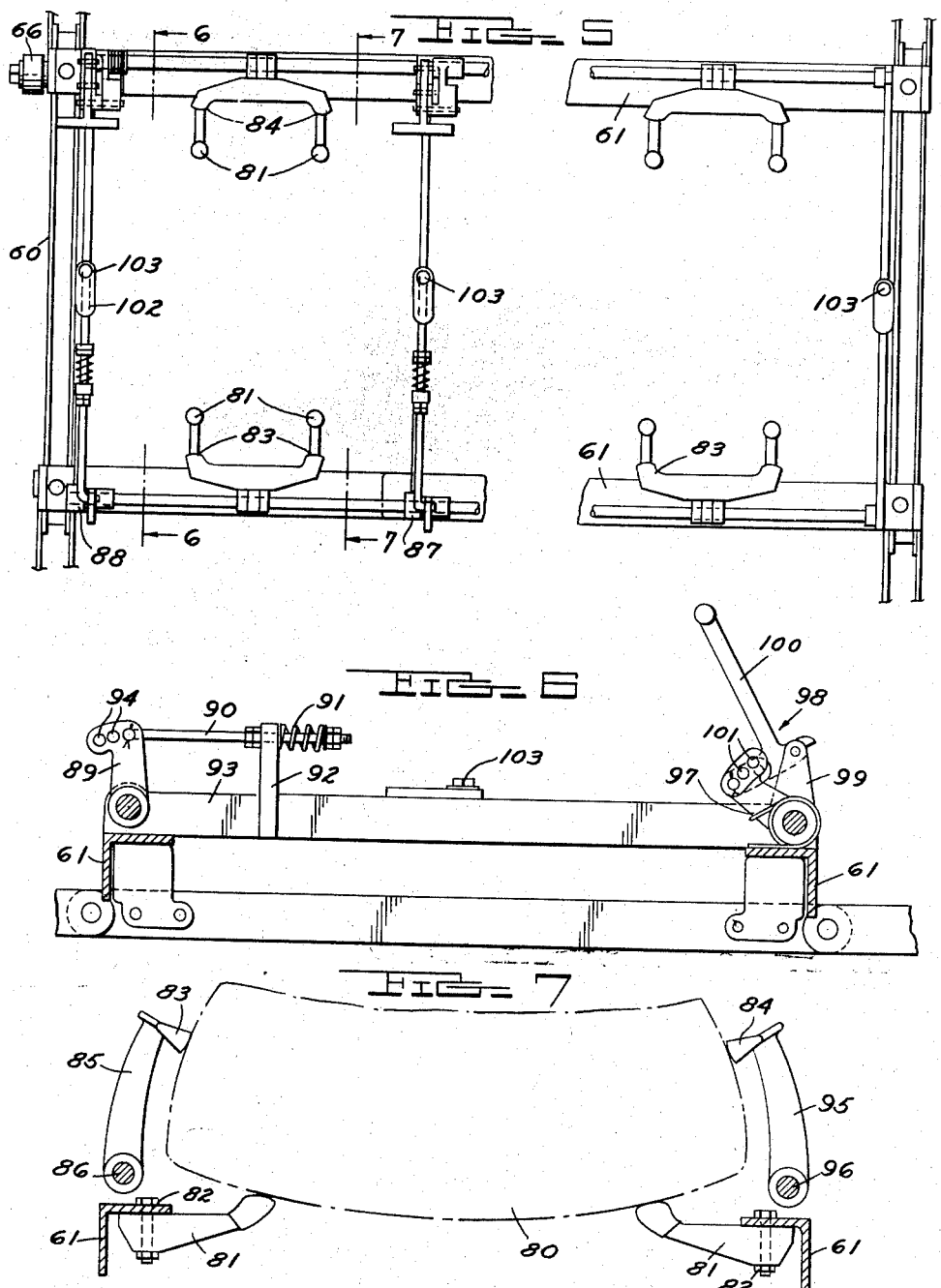

United States Patent Office 2,868,352
Patented Jan. 13, 1959

2,868,352

TELEVISION TUBE SETTLING CONVEYOR

Homer S. Harrison, Detroit, Mich., assignor to Allied Steel and Conveyors, Inc., Detroit, Mich., a corporation of Michigan Application September 24, 1954, Serial No. 458,061

3 Claims. (Cl. 198—137)

This invention relates to improvements in a conveyor which is particularly directed to meet unusual and critical requirements for smooth, steady, nonvibrating conveyance of articles.

The particular use for which such conveyor was developed involved the processing of television screen tubes wherein powdered phosphorescent screen material is deposited on the inner face of the tube in a uniform layer by introducing such material in a liquid suspension within the tube and then permitting the powder to gradually settle from the suspension onto the inner face of the tube. Since any vibration, irregular or sudden movement of the tube during the settling action will cause a washing action of the liquid leaving rings or other irregular deposits of the phosphorescent material, it is necessary to approach a condition of complete stability of the liquid during the settling time.

While the process was first carried out in stationary stands for television tubes, numerous considerations pointed to the desirability of carrying out the settling action on a steadily moving endless conveyor. For example, since a satisfactory application of the phosphorescent material involves the necessity of an accurately uniform settling time after which the liquid vehicle must be poured off, the use of an endless conveyor facilitates the accurate timing of settling action as well as providing an automatic means for pouring off the liquid as the television tubes pass around the end of the head sprocket. Furthermore, an endless conveyor provides straight line continues production characteristics desirable for high volume output.

In my prior co-pending United States application Serial No. 189,405, now Patent No. 2,698,078, filed on October 10, 1950, I disclose a complete conveyor and drive system suitable for use as a settling conveyor. Such conveyor, which has been found satisfactory in operation and has gone into extensive commercial use in the television tube manufacturing industry, involves the use of a pair of laterally spaced endless conveyor chains passing over head and tail sprockets, which chains serve to move rigid pallets extending between the chains on which television tubes are mounted. At the time my prior conveyor was developed it was thought desirable to employ very short pitch conveyor chain links in order to minimize pulsations arising from end sprocket engagement of the conveyor chains and the pallets employed therein longitudinally span ten full chain links. Due to the different chording effect of the chain links and pallets in passing around the sprockets arising from the different effective pitch lengths, one end of each pallet is connected on either side to the conveyor chains through a vertical compensating link while the other end is directly connected on the axis of the adjacent chain pivots. While such arrangement has proved superior in operation to settling conveyors theretofore developed, it was found that the leverage of the load acting on each pallet as it passed around the end sprocket tended to pull the chain links connected to the upper ends of the pallet out of engagement with the sprocket. Thus, it was found necessary to run the conveyor under a substantial chain tensioning load in order to prevent chain disengagement of the sprocket with undesired sudden movement of the pallet.

The present application discloses an alternative conveyor construction which has proved superior in operation to that of my prior application. In the present construction chain links are employed having a length equal to the entire pitch length of the television tube spacing. This not only simplifies the construction by eliminating any difference in chording effect, but also substantially alleviates the problem of chain separation from the sprocket by taking advantage of the much greater moment arm on which chain tension operates to hold the chain in positive engagement with the sprocket.

While the use of such elongated chain links, only three of which may span the entire diameter of the drive sprocket, produces a fluctuation in the speed of conveyor travel, such fluctuation has been found in practice to be so gradual and of such low frequency as to produce no discernible washing action or undesirable ringmarks in the settling operation, but instead results in a smoother coating than was possible with the earlier construction.

Accordingly it is the principal object of the present invention to improve my prior settling conveyor construction by employing a chain pitch length equal to the television tube spacing in order to provide more positive means for preventing chain displacement from the sprocket arising from leverage action of the load acting on the chain links as they pass over the sprocket.

Another object is to minimize movement in the chain take-up means necessary to compensate for the chording effect of the relatively long chain links.

These and other objects will be more readily understood from the following detailed description of a particular embodiment of my improved construction and from an examination of the drawings disclosing the same wherein:

Fig. 5 is a fragmentary plan view of the present settling conveyor shown with television tube clamps mounted thereon.

Fig. 6 is a sectional elevation taken along the line 6—6 of Fig. 5.

Fig. 7 is a sectional elevation taken along the line 7—7 of Fig. 5.

Figure 1:
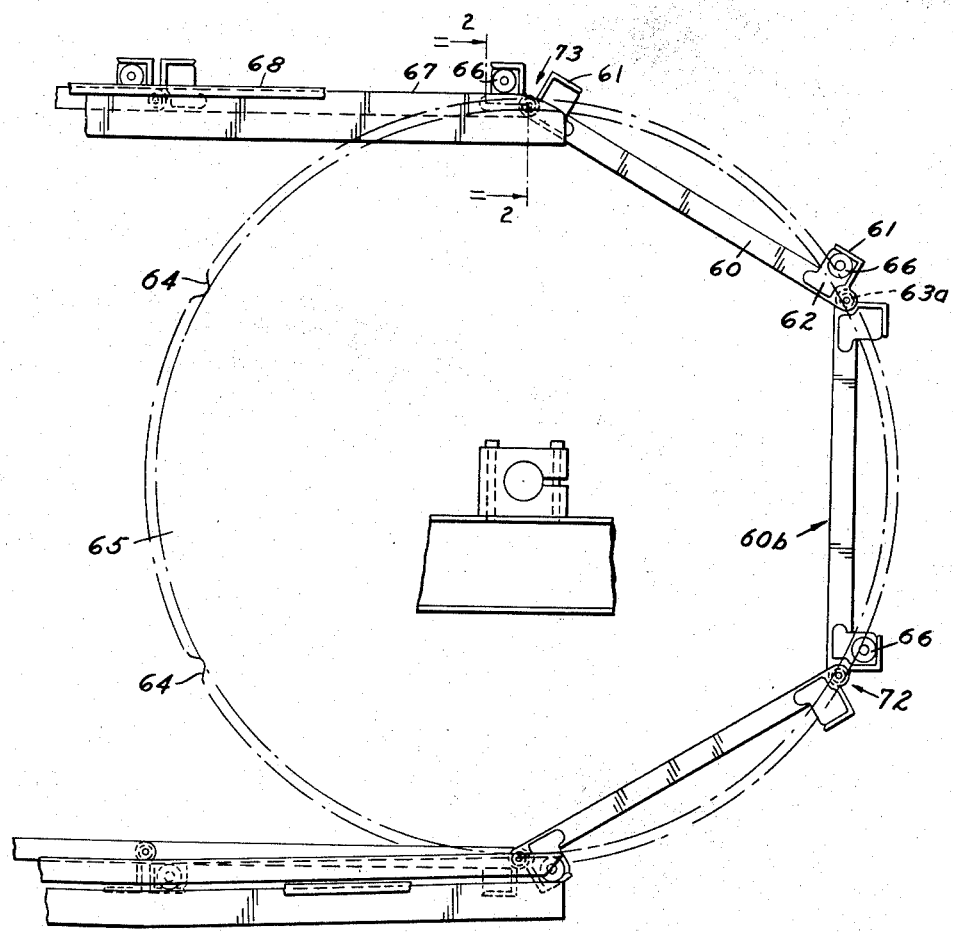
Fig. 1 is a side elevation of a conveyor head sprocket showing the relationship of chain and television tube supports passing thereover.
Figure 2:
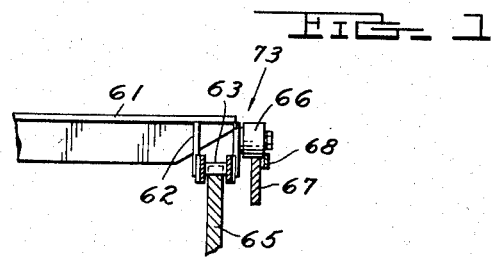
Fig. 2 is a fragmentary sectional view taken along the line 2—2 of Fig. 1.

Referring to Figs. 1 and 2 it will be seen that elongated chain links 60, are connected rigidly to longitudinally spaced tube clamp supports 61 by vertical members 62. Roller sleeves 63, between the pivotally connected ends of the respective chain links, engage sprocket teeth 64 in what may be considered as a 6-tooth sprocket 65. A roller 66 mounted on one of the members 62 at either side of each forward support 61 engages a horizontal track 67, extending between the drive sprocket 65 and a tail sprocket at the other end of the conveyor, such rollers running between guide strips 68, which maintain the conveyor in a centralized position.

Figure 3:
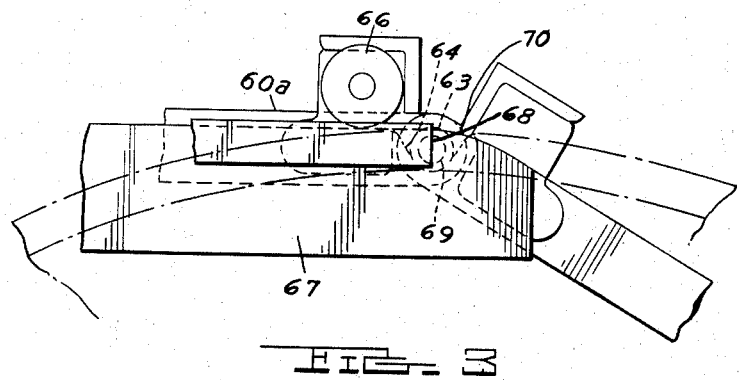
Fig. 3 is an enlarged fragmentary view of the chain and television tube support connection, shown in Fig. 1, at the point where such connection enters into sprocket engagement.

As best shown in Fig. 3, the end of the track 67 is provided with a curved section 70, which is effective to transfer gradually the load at the forward end of the support 61 from the roller 66 and track 67 to the roller sleeves 63 and sprocket teeth 64, thereby assuring a gradual take-up of any clearance in the pivotal connections.

Figure 4:
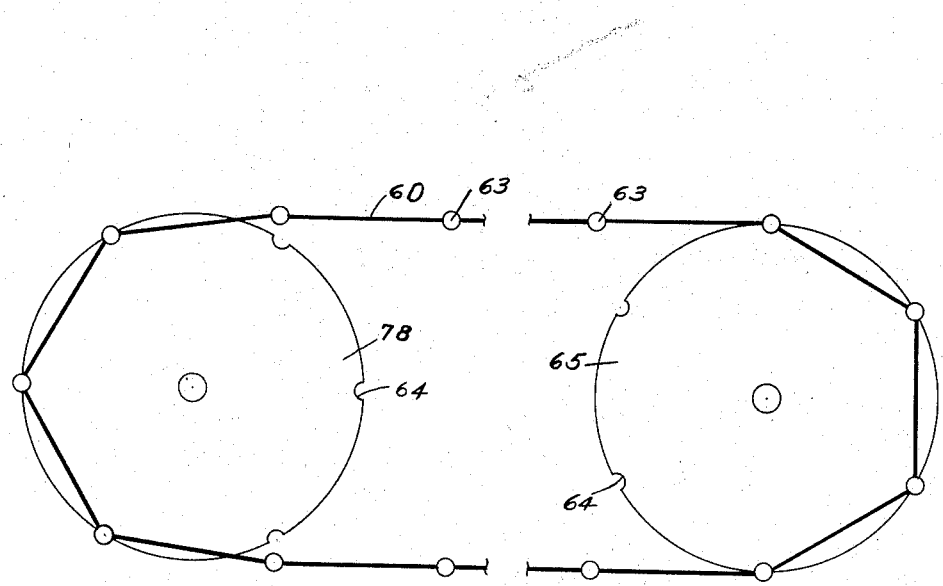
Fig. 4 is a schematic side elevation of the drive and tail sprockets of such conveyor, showing the relationship of chain engagement at the two ends of the conveyor.

As shown in Fig. 4, the conveyor is constructed with even pitch drive and tail sprockets 65 and 78 and an odd number of links 60 so that an out-of-phase relationship will be maintained in the pattern of drive and tail sprocket engagement. This is desirable in order to minimize the take-up movement of the tail sprocket 78 necessary to maintain constant tension on the chain as the chord relationship of the chain links in engagement with the respective sprockets varies. Thus, as shown in Fig. 4, the effective chain length required to pass around the tail sprocket 78 is at a minimum, while the corresponding effective chain length passing around the drive sprocket 65 is at a maximum, and since such effective chain length values will be increasing at one end while they are decreasing at the other, the out-of-phase relationship of engagement causes such values to substantially cancel each other in terms of required tail shaft movement.

Referring to Figs. 5, 6 and 7, suitable television tube clamping means are shown mounted on the clamp supports 61. As will be apparent from an examination of Figs. 5 and 7, each television tube 80 is held by four lower clamp elements 81 rigidly bolted at 82 to the clamp supports 61, by two upper resiliently mounted elements 83, and by two upper toggle actuated clamp elements 84. As apparent from Fig. 5, a plurality of such clamp assemblies may be provided across the width of the conveyor, the operation of which may be understood by reference to a single clamp assembly.

The clamp elements 83 are actuated by a bell crank arm 85 and a cross shaft 86 journaled in bearings 87 and 88, which shaft is in turn actuated by a bell crank arm 89 and a pull rod 90 urged by a spring 91 reacting against an upwardly extending element 92 fixed on a longitudinal bar 93 extending between and suitably attached to a pair of the clamp supports 61. A plurality of adjustment holes 94 may be provided in the bell crank arm 89 to provide desired spring tension on the clamp elements 83 for different sizes of television tubes.

The clamp elements 84 are similarly actuated through a bell crank arm 95, across shaft 96, and bell crank arm 97. In this case, however, the arm 97 is actuated by a toggle mechanism 98 having alignable linkage extending between a fixed arm 99 and the arm 97, a suitable handle 100 being provided to actuate the toggle linkage. Adjustment holes 101 provided in the actuating arm 97 permit the clamp elements 84 to likewise be adjusted for different size television tubes.

The tube may be laterally located in proper clamping position relative to guide bars 102 adjustably held by bolt 103. Thus for different diameter tubes, the guide bar 102 may be set to gauge the loading position of the tube with its center line midway between clamp elements 81.

With the toggle actuating handle 100 retracted to release the clamping elements 84, the television tube may be readily inserted into engagement with the remaining clamp elements whereupon the closing of the toggle mechanism 98 will cause the clamp elements 84 to lock the tube firmly in position against the spring-loaded clamp elements 83 and rigid clamp elements 81.

With regard to the advantage of this construction in maintaining the chain connections in engagement with the sprockets, it will be seen, with reference to Fig. 1, that any overhanging load on the chain links 60b tending to move the chain roller sleeves 63a out of engagement with the sprocket teeth will be resisted by chain tension acting between the chain connecting points 72 and 73, having a very substantial moment arm relative to the sleeves 63a, thereby minimizing the chain tension required to positively maintain full chain and sprocket engagement at all times as compared with the much higher chain tension required with short pitch chain.

Since the gradual undulating change in rate of conveyor speed incident to the chording effect of the long chain links is of a sufficiently low frequency as to render any washing action of settling solution imperceptible, the present construction has proved highly effective in a settling conveyor for television tubes. Relative to the conveyor of my aforementioned prior application, the present simpler and less expensive construction has been found by experience to provide superior results and to require less chain tensioning with lower over-all friction and wear.

While a particular embodiment of my improved construction has been disclosed herein in detail, it will be understood that numerous modifications might be resorted to without departing from the scope of my invention as set forth in the following claims.

I claim:

1. A television tube settling conveyor of the class described characterized by longitudinally and laterally spaced end sprockets, pivotally connected conveyor chain links engaging said sprockets having a pitch length equal to the longitudinal spacing of successive television tubes carried on said conveyor with said length comprising a large chord (in the order of 60°) of said sprockets, horizontal stationary laterally positioned side track means extending throughout the entire distance between said end sprockets along the upper flight of said conveyor, laterally positioned side rollers attached to one end of said chain links adapted to engage said track and support said conveyor between sprockets along said upper flight, said track means including a gradually curved end portion adapted to gradually transfer the load of said conveyor from said stationary track to said sprocket when said rollers reach the end of said upper flight.

2. A television tube settling conveyor of the class described characterized by laterally and longitudinally spaced tail and head sprockets, pivotally connected chain links engaging said sprockets having a pitch length equal to the longitudinal spacing of successive television tubes carried on said conveyor, horizontal guide tracks for the upper reach of said conveyor extending laterally of said sprockets throughout substantially the entire distance between tail and head sprocket centers, and laterally positioned side rollers attached to one end of said chain links adapted to engage said tracks and support said conveyor in level travel between sprockets, said rollers remaining in engagement with said track until the load on the corresponding ends of said chain links is transferred to said head sprockets.

3. A television tube settling conveyor as set forth in claim 2 wherein the guide tracks are provided with gradually curved ends adapted to gradually transfer the load on the ends of the chain links from the guide tracks to the head sprockets.

References Cited in the file of this patent

UNITED STATES PATENTS

| | | |
|---|---|---|
| 815,707 | Hutchison | Mar. 20, 1906 |
| 1,206,807 | Bragg | Dec. 5, 1916 |
| 2,698,078 | Harrison | Dec. 28, 1954 |
| 2,698,597 | Buck | Jan. 4, 1955 |